United States Patent [19]
Rackov et al.

[11] Patent Number: 5,524,906
[45] Date of Patent: Jun. 11, 1996

[54] GASKET FOR EXHAUST SYSTEM JOINT

[75] Inventors: John Rackov, Brighton; Ingjiun D. Chang, Ann Arbor, both of Mich.

[73] Assignee: MascoTech Tubular Products, Inc., Hamburg, Mich.

[21] Appl. No.: 276,297

[22] Filed: Jul. 18, 1994

[51] Int. Cl.⁶ .............................. F16J 15/00; F16L 17/00
[52] U.S. Cl. ................. 277/189; 277/207 A; 277/235 B; 285/368; 285/917
[58] Field of Search ................. 277/9, 9.5, 189, 277/207 A, 235 B, 236, 213, 207 R; 285/23, 368, 379, 917

[56] References Cited

U.S. PATENT DOCUMENTS

| | | |
|---|---|---|
| Re. 31,889 | 5/1985 | Nonnenmann et al. . |
| 316,492 | 4/1885 | Simpson et al. . |
| 1,133,320 | 3/1915 | Rockwood ............................ 277/236 |
| 1,787,942 | 1/1931 | Kallach, Jr. . |
| 1,865,444 | 7/1932 | Recker et al. . |
| 2,331,325 | 10/1943 | Jensen . |
| 2,367,753 | 1/1945 | Buck . |
| 2,462,040 | 2/1949 | Hiertz . |
| 2,695,446 | 11/1954 | Meyer . |
| 3,002,269 | 10/1961 | Hopkins . |
| 3,017,695 | 1/1962 | James . |
| 3,209,438 | 10/1965 | Brown . |
| 3,404,445 | 10/1968 | Crouse . |
| 3,427,053 | 2/1969 | Dunlap et al. ........................... 285/379 |
| 3,841,435 | 10/1974 | Hetherington . |
| 3,857,151 | 12/1974 | Young et al. . |
| 4,151,632 | 5/1979 | Green . |
| 4,159,741 | 7/1979 | Nonnenmann et al. . |
| 4,226,280 | 10/1980 | Hellouin de Cenival . |
| 4,305,459 | 12/1981 | Nonnenmann et al. . |
| 4,316,503 | 2/1982 | Kurachi et al. . |
| 4,333,672 | 6/1982 | Arthur et al. . |
| 4,334,703 | 6/1982 | Arthur et al. . |
| 4,419,802 | 12/1983 | Riese . |
| 4,483,161 | 11/1984 | Izzi, Sr. ................. 277/207 A |
| 4,547,942 | 10/1985 | Fukuda . |
| 4,597,596 | 7/1986 | Tozer ..................... 285/917 |
| 4,875,270 | 10/1989 | Krips et al. . |
| 5,393,108 | 2/1995 | Kerr ....................... 285/368 |
| 5,409,337 | 4/1995 | Muyskens et al. .................... 285/379 |

*Primary Examiner*—Daniel G. DePumpo
*Attorney, Agent, or Firm*—Edgar A. Zarins; Malcolm L. Sutherland

[57] ABSTRACT

A gasket for a connection joint of a vehicle exhaust system to seal two sections of the system against leakage of exhaust. The gasket is an integral ring consisting of a main flange portion which is disposed between the connected sections of the exhaust system and a perpendicular radial flange which extends into the exhaust tube. The main flange includes a raised circumferential seal ridge. The radial flange includes a plurality of serrations which engage the interior of the exhaust section to retard rotation and removal of the gasket.

3 Claims, 1 Drawing Sheet

U.S. Patent     Jun. 11, 1996     5,524,906
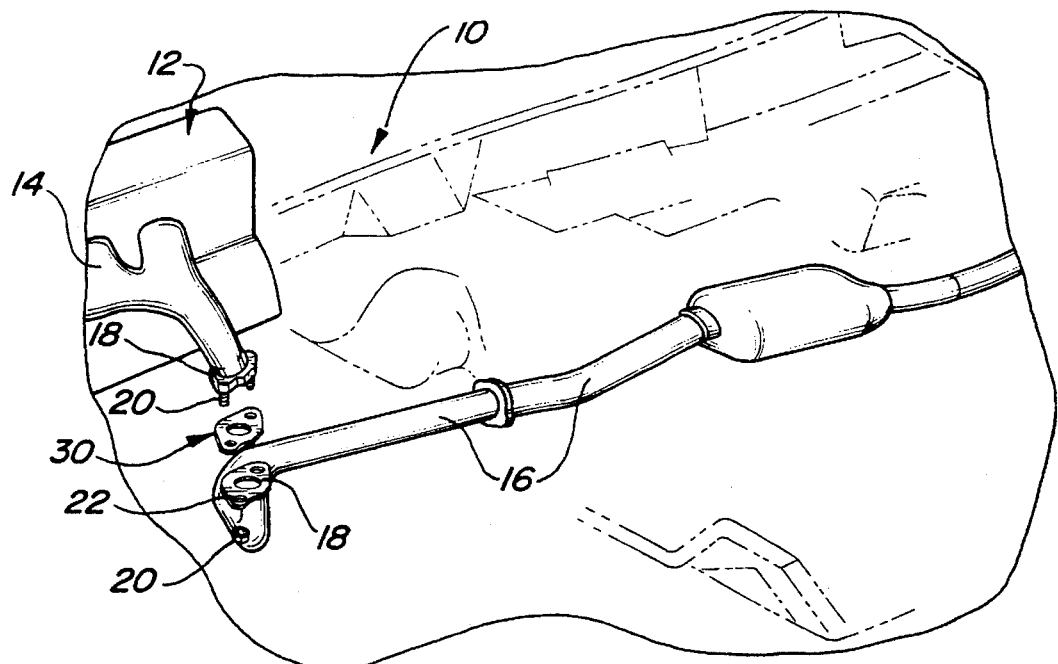
*Fig-1*
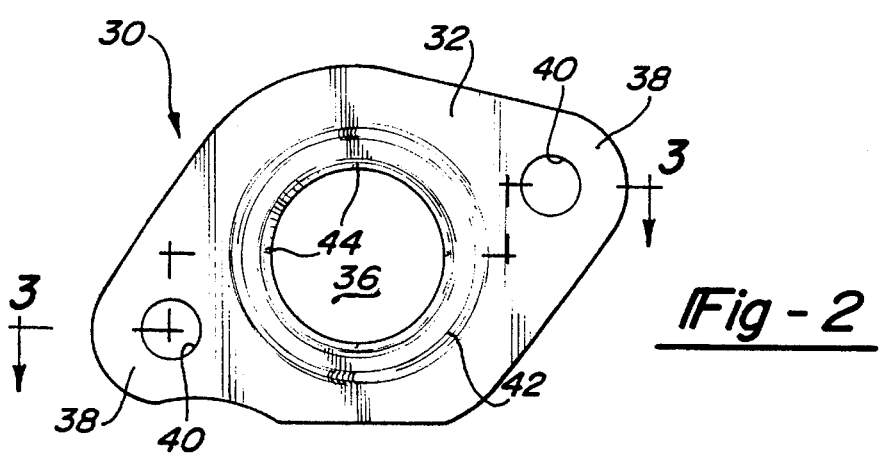
*Fig-2*
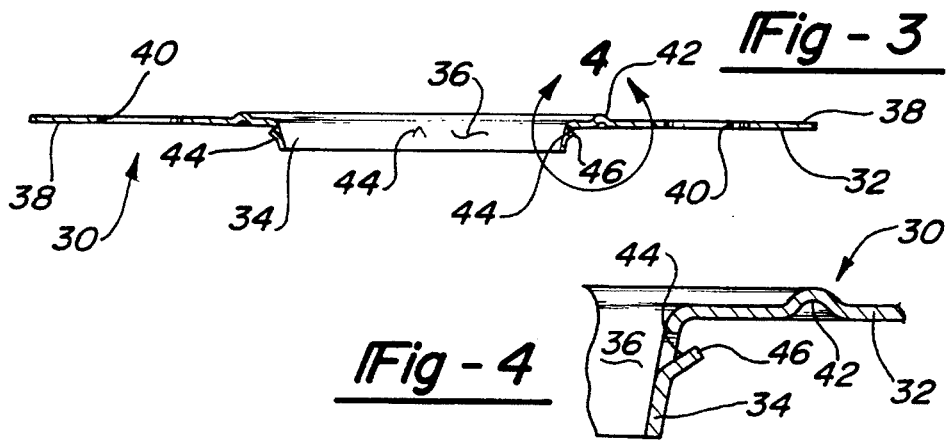
*Fig-3*
*Fig-4*

GASKET FOR EXHAUST SYSTEM JOINT

BACKGROUND OF THE INVENTION

I. Field of the Invention

This invention relates to a gasket to seal a joint connecting two sections of an exhaust system for a vehicle and, in particular, to a gasket which incorporates means for improving the sealing capabilities along the joint as well as structure for seating the gasket retarding rotational and axial movement of the gasket within the joint.

II. Description of the Prior Art

Government regulations have increasingly limited the permissible levels of leakage within an exhaust system of a vehicle. By minimizing exhaust leakage and thereby maximizing the flow of exhaust through the system, pollution control devices are provided every opportunity to eliminate harmful pollutants. Furthermore, exhaust leakage beneath the vehicle can be harmful to the vehicle occupants and therefore the system should maximize the flow of exhaust to the rear of the vehicle. The exhaust system is also designed to muffle noise from the engine resulting from combustion and any leaks would allow this noise to escape.

The gaskets or seals used in exhaust systems are provided in a variety of configurations, but are subject to extreme levels of heat and pressure which can result in their deterioration and failure. The most common is the flat gasket which is dependent upon the clamping force of the system flanges. As heat and pressure vary, expansion and contraction of the joint allows leakage. Various alternatives have been utilized including bi-metallic seals designed to expand differently to ensure that at least one component is sealing the joint. Compression beads and ancillary flanges may also be used to accommodate expansion of the exhaust joint to prevent leakage between components.

Of concern in the assembly of exhaust systems is improper seating of the gasket seal. Flat gaskets must be carefully positioned to ensure proper sealing. Even gaskets which partially mate with a component can rotate out of alignment compromising the sealing ability of the gasket. Despite all of these requirements, the gasket must remain a relatively inexpensive component of the exhaust system and therefore simple to manufacture.

SUMMARY OF THE PRESENT INVENTION

The present invention overcomes the disadvantages of the prior known exhaust system gaskets by providing a simply constructed seal between components of the exhaust system which is matingly seated against rotational and axial movement.

The gasket of the present invention is adapted to seal a joint between components of a vehicle exhaust system. The gasket may be used on the exhaust manifolds to seal the joint between the cylinder head and manifold inlet flanges or, alternatively, between two sections of the exhaust system. The gasket is designed to be pre-assembled to the manifold or other component where it will remain in its installed position.

The gasket includes a primary flange portion which is disposed between the connecting flanges of the exhaust components and a secondary flange which is substantially perpendicular to the primary flange forming the center opening of the gasket. The primary flange includes an annular sealing ridge coaxial with the center opening of the gasket. The annular ridge is adapted to maintain sealing contact with both components of the exhaust joint. In a preferred embodiment, the primary flange includes apertures through which the connecting bolts extend.

The secondary flange portion is integral with and disposed substantially perpendicular to the primary flange forming an annular sleeve for the center opening. The secondary flange is adapted to be matingly received within a tubular portion of the exhaust system to sealingly engage the tubular walls. The secondary flange is designed to extend into the downstream end of the joint so as to direct flow past the joint. The pressure levels of the exhaust system will push the secondary flange outwardly against the tube walls. A plurality of triangular serrations are formed in the secondary flange. The serrations are bent radially outwardly so as to engage the tubular walls of the exhaust system and will tend to be compressed by the fluid pressure outwardly against the secondary flange. The serrations are triangular to substantially form teeth which engage the tubular walls of the exhaust system. The serration points are positioned so that any force tending to remove or rotate the gasket will cause the teeth to dig into the tubular walls maintaining position.

Other objects, features and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which:

FIG. 1 is an exploded perspective view of a vehicle exhaust system embodying the gasket of the present invention;

FIG. 2 is a plan view of the gasket;

FIG. 3 is a cross-sectional view of the gasket taken along lines 3—3 of FIG. 2; and FIG. 4 is an enlarged cross-sectional view of the area 4 of FIG. 3.

DETAILED DESCRIPTION OF A PREFERRED EMBODIMENT OF THE PRESENT INVENTION

Referring first to FIG. 1, there is shown an exhaust system 10 for a vehicle designed to direct exhaust gases from an engine 12 through an exhaust manifold 14 and interconnected sections of an exhaust assembly 16. The sections 16 of the exhaust system 10 typically include connecting flanges 18 having means for accepting fasteners 20 to connect the sections 16. The fasteners 20 are preferably bolts and nuts which extend through apertures 22 in the flanges 18. In this manner, the flanges 18 are mounted in flush arrangement forming a joint between sections 16 of the exhaust system 10. Due to extreme temperatures and pressures, exhaust gases tend to leak between flanges 18.

Referring now to FIGS. 2 through 4, a gasket 30 is provided between the flanges 18 of the exhaust sections 16 to prevent exhaust gas leakage. The gasket 30 has a substantially planar overall configuration as best shown in FIG. 3, in order to fit between the connecting flanges 18. The gasket 30 includes a primary flange portion 32 adapted to be disposed in parallel flush relationship between the connecting flanges 18, and a secondary flange portion 34 formed integral with and substantially perpendicular to the primary flange portion 32. The secondary flange 34 forms a central aperture 36 through which exhaust gases can flow.

The primary flange 32 preferably includes a pair of ears 38 having bolt holes through which the mounting fasteners 20 can extend. Formed in the primary flange 32 coaxial to the central aperture 36 is a raised compression ridge 42. The annular ridge 42 has a semi-circular cross-sectional configuration to create an elevation higher than the planar elevation of the flange 32. The ridge 42 is designed to be compressed between the connecting flanges 18 of the exhaust system 16 to ensure sealing contact with both flanges 18 around the exhaust passageway. The compression ridge 42 also ensures sealing contact as the temperature of the components varies during operation. In a preferred embodiment, the ridge 42 is simply formed in the flange 32 maintaining the material thickness of the overall gasket 30.

The secondary flange 34 is integrally formed with the primary flange 32 substantially perpendicular thereto forming a tubular passageway 36. The secondary flange 34 includes a plurality of serrations 44 radially spaced around the flange 34. Preferably, the serrations 44 have a triangular configuration with a point 46 directed towards the primary flange 32. The serrations 44 are bent radially outwardly such that they engage the tubular passageway of the exhaust system components 16 thereby retarding movement of the gasket 30 relative to the connector flanges 18. The serration points 46 are positioned so that-.any force tending to remove the gasket 30 from the exhaust component 16 will cause the serration 44 to dig into the tubular wall preventing removal. As a result, the gasket 30 may be preassembled to the exhaust system components 16 and will remain in the installed position. The serration 44 location and alignment may be adapted to also stop axial rotation of the gasket 30 thereby keeping the bolt holes 40 aligned with the bolt holes 22 in the flange 18.

The foregoing detailed description has been given for clearness of understanding only and no unnecessary limitations should be understood therefrom as some modifications will be obvious to those skilled in the art without departing from the scope and spirit of the appended claims.

What is claimed is:

1. In a vehicle exhaust system for directing exhaust gases through interconnected tubular exhaust components, the exhaust components interconnected through flange members having fastening means, the improvement comprising:

a gasket for sealing between interconnected flange members of the exhaust system, said gasket including a primary flange portion sealingly disposed between the interconnected flange members and a secondary flange portion forming a tubular axial passageway substantially perpendicular to said primary flange portion, said primary flange portion including apertures for receiving the fastening means to prevent displacement of said gasket relative to the interconnected flange members and an annular sealing ridge formed coaxially to said tubular passageway radially inwardly of said apertures and said secondary flange portion having means for retaining said gasket within the exhaust component, said retaining means including a plurality of radially spaced serrations in said secondary flange, said serrations angled radially outwardly from said secondary flange such that said serrations engage the exhaust component retarding removal of said gasket from the exhaust component.

2. The improvement as defined in claim 1 wherein said annular sealing ridge formed coaxially to said tubular passageway comprises a semi-circular ridge projecting axially from said primary flange in a direction opposite of said tubular axial passageway.

3. A gasket for sealing a joint within a vehicle exhaust system, the exhaust system including interconnected tubular exhaust components having flange members attached by fasteners, said gasket comprising:

an integral body having a primary flange portion and a secondary flange portion, said primary flange portion adapted to be sealingly disposed between interconnected flange members of the exhaust components and including a plurality of apertures to receive the fasteners therethrough and sealing means formed in said primary flange portion, said secondary flange portion forming a tubular axial passageway substantially perpendicular to said primary flange portion, said sealing means including an annular sealing ridge formed coaxially to and projecting axially opposite said tubular passageway, said annular sealing ridge adapted to engage the flange members of the exhaust components to prevent exhaust leakage between the flange members and said secondary flange portion including means for retaining said gasket seated within the exhaust component comprising a plurality of outwardly angled serrations radially spaced about said second flange portion such that said serrations engage the exhaust component retarding removal of said gasket form the exhaust component.

* * * * *